United States Patent
Reitsma et al.

(10) Patent No.: US 10,581,917 B2
(45) Date of Patent: Mar. 3, 2020

(54) SYSTEMS AND METHODS FOR ENFORCING DEVICE POLICIES

(71) Applicant: MOTOROLA SOLUTIONS, INC., Schaumburg, IL (US)

(72) Inventors: Katrin Reitsma, Chicago, IL (US); Daniel S. Griesmann, Villa Park, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 178 days.

(21) Appl. No.: 15/182,408

(22) Filed: Jun. 14, 2016

(65) Prior Publication Data

US 2017/0359378 A1    Dec. 14, 2017

(51) Int. Cl.
| | |
|---|---|
| *H04L 29/06* | (2006.01) |
| *G06F 21/44* | (2013.01) |
| *G06F 21/73* | (2013.01) |
| *G06F 21/62* | (2013.01) |
| *G06F 9/455* | (2018.01) |

(52) U.S. Cl.
CPC ......... *H04L 63/20* (2013.01); *G06F 9/45558* (2013.01); *G06F 21/44* (2013.01); *G06F 21/6218* (2013.01); *G06F 21/73* (2013.01); *H04L 63/205* (2013.01); *G06F 2009/45587* (2013.01); *G06F 2221/2115* (2013.01)

(58) Field of Classification Search
CPC ...................................................... H04L 63/20
USPC ............................................................. 726/1
See application file for complete search history.

(56) References Cited

U.S. PATENT DOCUMENTS

| | | | |
|---|---|---|---|
| 7,174,563 B1 | 2/2007 | Brownlie et al. | |
| 7,751,331 B1* | 7/2010 | Blair | H04L 45/00 370/236 |
| 7,761,708 B2 | 7/2010 | Swander et al. | |
| 8,141,075 B1 | 3/2012 | Chawla et al. | |
| 8,904,477 B2 | 12/2014 | Barton et al. | |
| 9,112,911 B1* | 8/2015 | Karhade | H04L 63/0227 |
| 2007/0157203 A1* | 7/2007 | Lim | G06F 9/468 718/100 |
| 2008/0134176 A1* | 6/2008 | Fitzgerald | G06F 9/45537 718/1 |
| 2013/0139153 A1* | 5/2013 | Shah | G06F 9/45558 718/1 |

(Continued)

OTHER PUBLICATIONS

PCT/US2017/032761 International Search Report and Written Opinion of the International Searching Authority dated Jul. 20, 2017 (13 pages).

*Primary Examiner* — Peter C Shaw
(74) *Attorney, Agent, or Firm* — Michael Best & Friedrich LLP

(57) ABSTRACT

Systems and methods of enforcing device policies. One example method includes receiving, with an electronic processor and from a host virtual machine server, information regarding an electronic client device operating a guest virtual machine, and receiving, with the electronic processor, a policy check request from a server to the host virtual machine server. The policy check request includes a first set of policies generated by the server. The method also includes generating, with the electronic processor, a second set of policies based on information received from the host virtual machine server, and sending, from the electronic processor the second set of policies to the host virtual machine server.

16 Claims, 6 Drawing Sheets

(56) References Cited

U.S. PATENT DOCUMENTS

| | | | |
|---|---|---|---|
| 2014/0095868 A1 | 4/2014 | Korthny et al. | |
| 2014/0108649 A1* | 4/2014 | Barton | G06F 9/45533 709/224 |
| 2014/0280846 A1* | 9/2014 | Gourlay | H04L 41/00 709/223 |
| 2015/0156219 A1* | 6/2015 | Narayanaswamy | G06F 9/5077 726/1 |
| 2015/0215772 A1* | 7/2015 | Gattu | H04W 8/245 455/418 |
| 2015/0381662 A1* | 12/2015 | Nair | H04L 63/20 726/1 |

* cited by examiner

SYSTEMS AND METHODS FOR ENFORCING DEVICE POLICIES

BACKGROUND OF THE INVENTION

Enterprise servers that provide access to sensitive data, services, and/or networks to client devices typically enforce specific policies before granting access. The policies are intended to prevent compromised or vulnerable client devices from accessing the sensitive data, services, and/or networks. These compromised or vulnerable client devices may compromise the security, integrity, and/or availability of the accessed data, services and/or networks. As the proliferation of mobile electronic devices (for example, tablet computers and smart telephones) increases, and more organizations are implementing "Bring Your Own Device" (BYOD) policies, it becomes more difficult to ensure that the correct policies are enforced on the connecting client device.

Additionally, the use of mobile virtual systems to access sensitive data, services and/or networks makes it more difficult for the enterprise server to ensure that all the device-oriented policies (for example, policies that the enterprise server expects the client device to implement) are met by the client device.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
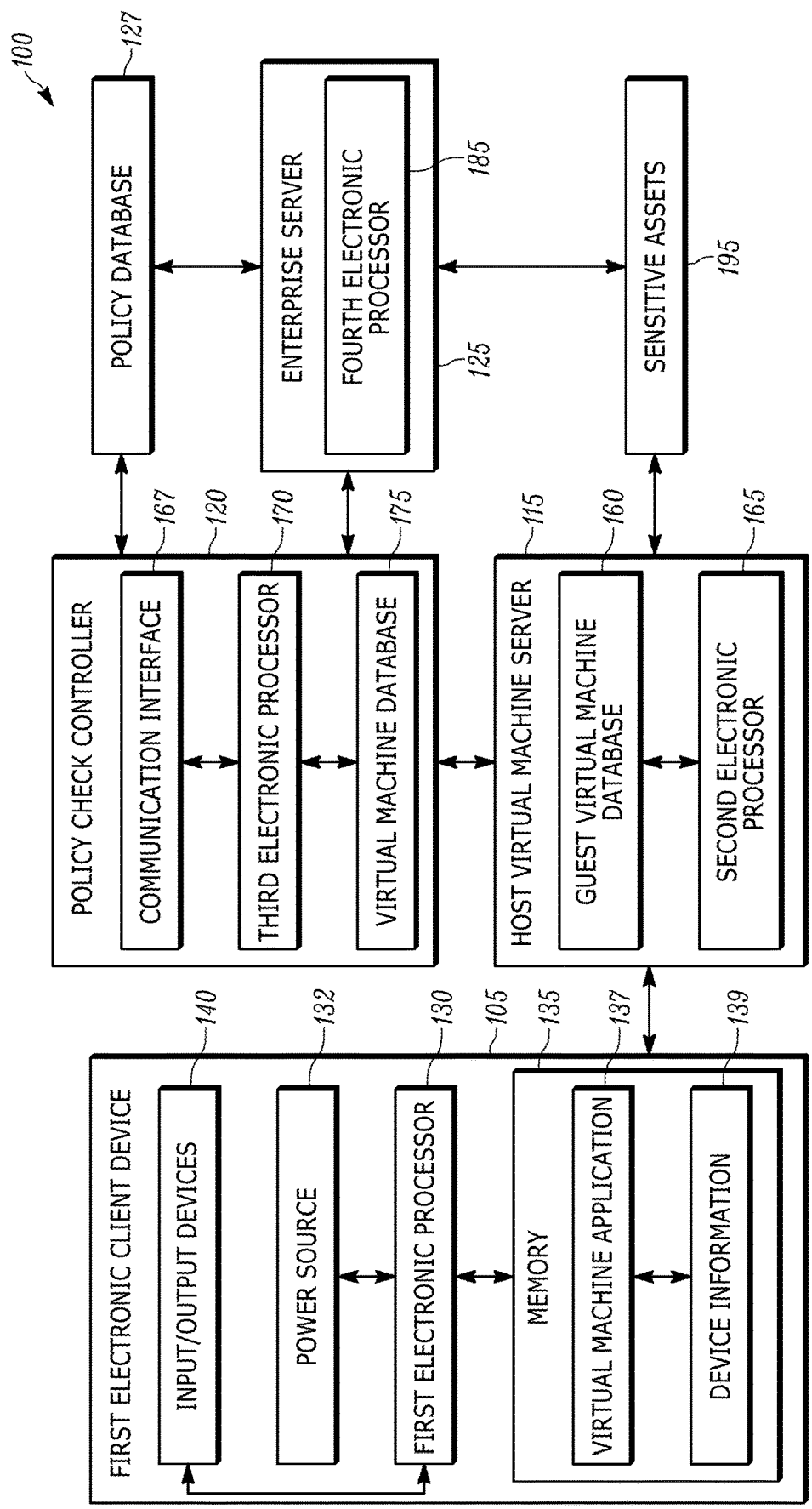
FIG. 1 is a diagram of a virtual mobile system according to some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One exemplary embodiment provides a method of enforcing device policies. The method includes receiving, with an electronic processor and from a host virtual machine server, information regarding an electronic client device operating a guest virtual machine, and receiving, with the electronic processor, a first set of policies determined based on the information received regarding the mobile client device. The method also provides generating, with the electronic processor, a second set of policies based on the first set of policies, and sending, from the electronic processor, the second set of policies to the host virtual machine server. The method also includes sending, from the electronic processor, an instruction to the host virtual machine server to send the second set of policies to the electronic client device.

Another exemplary embodiment provides a policy check controller including a communication interface and an electronic processor. The communication interface is configured to exchange messages between an electronic processor and a host virtual machine server, and between the electronic processor and the server. The electronic processor is coupled to the communication interface, and configured to receive, with the communication interface, information from the host virtual machine server regarding an electronic client device operating a guest virtual machine. The electronic processor is also configured to receive, with the communication interface, a first set of policies based on the information received regarding the mobile client device, generate a second set of policies based on the first set of policies, and send, with the communication interface, the second set of policies to the host virtual machine server. The electronic processor is also configured to send, with the communication interface, an instruction to the host virtual machine server to the send the second set of policies to the electronic client device.

Another exemplary embodiment provides a method of enforcing device policies. The method includes receiving, with an electronic processor and from a host virtual machine server, information regarding an electronic client device operating a guest virtual machine, and receiving, with the electronic processor, a set of policies determined based on the information regarding the electronic client device. The method also includes sending, from the electronic processor, the set of policies to the host virtual machine server; and sending, from the electronic processor, an instruction to the host virtual machine server to send the set of policies to the electronic client device.

FIG. 1 is a block diagram of a virtual mobile system 100 according to an exemplary embodiment. In the illustrated example, the virtual mobile system 100 includes a first electronic client device 105, a host virtual machine server 115, a policy check controller 120, an enterprise server 125, and a policy database 127. In some embodiments, the virtual mobile system 100 may include more or less than the components shown in FIG. 1. For example, the virtual mobile system 100 may include multiple electronic client devices, host virtual machine servers, policy check controllers, enterprise servers, and/or policy databases. The enterprise server 125 provides access to the first electronic client device 105 to sensitive assets 195 after ensuring that the first electronic client device 105 enforces select policies. The sensitive assets 195, although shown generally in FIG. 1, may include, for example, sensitive data, services, and/or networks. In the embodiment illustrated, access to these assets is controlled by the enterprise server 125. To maintain the security, availability and integrity of the sensitive assets 195, and to simplify its security policies, the enterprise server 125 grants access to the first electronic client device 105 through the host virtual machine server 115 and the policy check controller 120. In some embodiments, more than one client device communicates with the host virtual machine server 115 and with the enterprise server 125 to request access to the sensitive assets 195. For example, the virtual mobile system 100 may include a second electronic client device that accesses the enterprise server 125. In such embodiments, the communications executed by the second electronic client device are similar to the communications executed by the first electronic client device 105.

The first electronic client device 105 in this example can be, for example, a mobile electronic device such as a smart telephone, a cellular telephone, a two-way radio, a personal digital assistant (PDA), a tablet computer, a desktop computer, a laptop computer, or can be an electronic device running a mobile operating system such as, for example, iOS® and/or Android®.

As shown in FIG. 1, the first electronic client device 105 includes a first electronic processor 130, a power source 132, a memory 135, and input/output devices 140. In other embodiments, the first electronic client device 105 includes more or less components than those shown in FIG. 1. The power source 132 provides power to the components of the first electronic client device 105. The memory 135 includes a non-transitory computer readable medium storing, in the illustrated embodiment, a virtual machine application (or program) 137 and first device information 139. The virtual machine application 137 communicates with the host virtual machine server 115 to operate a guest virtual machine on the first electronic client device 105. In some embodiments, the first electronic client device 105 displays the guest virtual machine to allow a user to interact with the guest virtual machine. The virtual machine application 137 may store instructions for execution by the first electronic processor 130 to operate the guest virtual machine. The virtual machine application 137 enforces specific policies on the first electronic client device 105 to prevent vulnerable and/or compromised electronic client devices from accessing the sensitive assets 195.

The first device information 139 includes information regarding the first electronic client device 105. In particular, the first device information 139 includes characteristics of the first electronic client device 105 such as, for example, an operating system of the first electronic client device 105, a version of the operating system (for example, an operating system version number), patch level or status of the operating system of the first electronic client device 105, specific hardware (for example, processor model, external memory such as Secure Digital (SD) cards) of the first electronic client device 105, carrier associated with the first electronic client device 105, model number of the first electronic client device 105, and other characteristics of the first electronic client device 105 and/or the operation of the first electronic client device 105. In some embodiments, some or all of the first device information 139 is stored in the first electronic processor 130 rather than the memory 135.

The input/output devices 140 enable the first electronic client device 105 to receive input signals and output requested information. In some embodiments, the input/output devices 140 may include physical buttons and switches, touch sensors, movement sensors, a microphone, voice recognition software, virtual buttons and switches, and/or a combination of the above to receive input signals. The input/output devices 140 may additionally allow the first electronic client device 105 to generate notifications and/or display information. For example, the input/output devices 140 may additionally or alternatively include a display, a speaker, and/or a vibrator. The first electronic client device 105 uses the input/output devices 140 to, for example, communicate certain conditions of the first electronic client device 105, and about applications running on the first electronic client device 105 (for example, a notification for a received telephone call).

The first electronic processor 130 is coupled to the power source 132 (which could, for example, be a battery), the memory 135, and the input/output devices 140. The first electronic processor 130 controls communication between the first electronic client device 105 and the host virtual machine server 115. The first electronic processor 130 also controls interactions between the various components of the first electronic client device 105.

The first electronic client device 105 is communicatively coupled to the host virtual machine server 115 via, for example, compatible communication interfaces (not shown). The host virtual machine server 115 includes hardware that provides guest virtual machines with computing resources such as processing power, memory, network inputs and outputs, and the like. The host virtual machine server 115 operates host virtual machines that each correspond to a guest virtual machine operating on a client device (for example, the first electronic client device 105) through the virtual machine application 137. As shown in FIG. 1, the host virtual machine server 115 includes a guest virtual machine database 160 and a second electronic processor 165. In some embodiments, the host virtual machine server 115 includes more or less components than those shown in FIG. 1. In some embodiments, the host virtual machine server 115 may include several electronic processors to distribute the processing power necessary to operate the host virtual machines. The second electronic processor 165 controls communications between the host virtual machine server 115 and the first electronic client device 105, the policy check controller 120, the enterprise server 125, and the sensitive assets 195. In particular, the second electronic processor 165 ensures that communications between the host virtual machine server 115 and the first electronic client device 105 enable reliable operation of a guest virtual machine on the first electronic client device 105.

The guest virtual machine database 160 stores information associating a specific guest virtual machine with a corresponding electronic client device (for example, the first electronic client device 105). In particular the host virtual machine server 115 assigns an identifier (for example, a guest virtual machine identifier) to each guest virtual machine operated at an electronic client device. Each host virtual machine server 115 may use different naming formats for assigning the identifier for the guest virtual machine. In one example, the host virtual machine server 115 may form the identifier by including an Internet Protocol (IP) address associated with the guest virtual machine followed by a specific pattern of letters and/or numbers. For example, the host virtual machine server 115 may assign 192.168.187.XXX as an identifier for a first guest virtual machine and may assign 192.168.145.XXX as an identifier for a second guest virtual machine. In another example, the host virtual machine server 115 may follow a specific naming convention when creating identifiers for the guest virtual machines. For example, the host virtual machine server 115 may utilize a naming convention in which the identifier for each guest virtual machine is made up of an identifier for the electronic client device operating the guest virtual machine followed by a guest virtual machine marker. For example, in such embodiments, the identifier for each guest virtual machine may have the following format: device_name_VM, where VM is a static marker signifying that the identifier corresponds to a guest virtual machine.

The guest virtual machine database 160 associates each identifier for a guest virtual machine (for example, each virtual machine) with, for example, an operating system of each guest virtual machine, policies enforced by the virtual machine application 137 operating each guest virtual machine, characteristics of the first electronic client device 105 and/or the operation of the first electronic client device 105 (for example, the operating system of the first electronic client device, the model of the first electronic client device, hardware used in the first electronic client device, the carrier associated with the first electronic client device, and/or user accounts associated with the first electronic client, and the like), and the like. The host virtual machine server 115 may additionally store information regarding the host virtual machine server 115 such as, for example, a service level agreement associated with a guest virtual machine and/or the host virtual machine server 115. The information regarding the host virtual machine server 115 may also include a file server (not shown) hosted in the host virtual machine server, and policies enforced by the host virtual machine server 115. In addition, information regarding the host virtual machine may also include policies enforced by the virtual machine application 137 stored on the first electronic client device 105 (for example, the policies may include preventing an installation of software on electronic client devices that are rooted, are not encrypted, and/or that do not have a strong screen or user interface lock). Other information may also be stored. In some embodiments, the host virtual machine server 115 also stores at least some of the device information for each client device in communication with the host virtual machine server 115 (for example, some of the first device information 139 described above with respect to the first electronic client device 105 may be stored by the host virtual machine server 115).

The host virtual machine server 115 is communicatively coupled to the policy check controller 120 via, for example, compatible communication interfaces (only one of which is shown in FIG. 1). The policy check controller 120 is communicatively coupled to the host virtual machine server 115, the policy database 127, and the enterprise server 125. As shown in FIG. 1, the policy check controller 120 includes a communication interface 167, a third electronic processor 170, and a virtual machine database 175. In other embodiments, the policy check controller 120 includes more or less components than those shown in FIG. 1.

The communication interface 167 exchanges messages with the enterprise server 125 and with the host virtual machine server 115. The communication interface 167 is coupled and controlled by the third electronic processor 170. In the illustrated embodiment, the communication interface 167 includes a transceiver that wirelessly exchanges messages with the host virtual machine server 115 and the enterprise server 125. In some embodiments, the communication interface 167, additionally or alternatively, includes a connector and/or a cable that enables wired communication with the host virtual machine server 115 and/or the enterprise server 125. The communication interface 167 also communicates with the policy database 127 to send information requests and receive information from the policy database 127.

The third electronic processor 170 controls the messages sent through the communication interface 167 to the host virtual machine server 115 and to the enterprise server 125. In particular, the third electronic processor 170 ensures that the security policies from the enterprise server 125 are enforced through the host virtual machine server and through the corresponding electronic client device (for example, the first electronic client device 105). The virtual machine database 175 stores a list of registered host virtual machine servers 115 and/or specific guest virtual machines associated with the corresponding client device (for example, the first electronic client device 105). In one example, the virtual machine database 175 stores a list of host virtual machine servers (for example, the host virtual machine server 115) and guest virtual machines. In other words, the virtual machine database 175 may store an IP address, a media access control (MAC) address, and/or a name associated with the guest virtual machine to identify the registered guest virtual machines. In such embodiments, the virtual machine database provides a static list of registered guest virtual machines, such that new instances of the guest virtual machines are to be added to the list before they are recognized as registered guest virtual machines.

In another embodiment, the virtual machine database 175 stores a list of host virtual machine servers (for example, the host virtual machine server 115) and the corresponding format of identifiers for the guest virtual machines. For example, the virtual machine database 175 may store an identifier for the host virtual machine server 115 and an associated naming convention for the host virtual machine server 115. For example, as described above, the host virtual machine server 115 may assign an identifier to each guest virtual machine based on the naming convention "device_name_VM." The virtual machine database 175 may then store an identifier for the host virtual machine server 115 and associate the identifier for the host virtual machine server 115 with the naming convention "device_name_VM." Therefore, based on information stored in the virtual machine database 175, the policy check controller 120 determines when an identifier corresponds to a guest virtual machine without having to store each identifier for each instance of the guest virtual machines managed by the host virtual machine server 115. The virtual machine database 175 also stores other host virtual machine servers providing virtual machine solutions to the electronic client devices along with their own naming conventions and/or formats. In this embodiment, the virtual machine database 175 provides the policy check controller 120 with a mechanism of determining which messages (for example, from the enterprise server 125) are destined to a guest virtual machine (for example, include a receiver address associated with a guest virtual machine), and which messages are not destined to a guest virtual machine (for example, include a receiver addresses corresponding to an identifier that is not associated with a guest virtual machine).

The policy database 127 stores a plurality of sets of policies to be met by the client devices (for example, the first electronic client device 105) to gain access to sensitive assets 195, for which access is controlled by the enterprise server 125. The policy database 127 stores different sets of policies that are each associated with a specific client device. For example, the policy database 127 may store a first set of policies that are associated with a client device having a first type of operating system, a first version of the operating system, and a first type of processor. The policy database 127 may also store a second set of policies that is different than the first set of policies, and may associate the second set of policies with a client device having a second type of operating system, the first version of the operating system, and the first type of processor. Because each client device (for example, the first electronic client device 105) may inherently enforce some policies, and because each client device may present different vulnerabilities and technical capabilities, the sets of policies associated with each client device may be different. The policy database 127 is accessible by both the policy check controller 120 and the enterprise server 125. As shown in FIG. 1, the policy database 127 is a separate component of the virtual mobile system 100. In some embodiments, however, the policy database 127 is part of the policy check controller 120. In yet other embodiments, the policy database 127 is part of the enterprise server 125.

As shown in FIG. 1, the policy check controller 120 is communicatively coupled to the enterprise server 125 (for example, to a communication interface of the enterprise server 125). The enterprise server 125 grants permission for the first electronic client device 105 to access the sensitive assets 195 (for example, e-mail services, data, personal identifiable information, financial information, and/or connectivity to a sensitive network).

The enterprise server 125 includes a fourth electronic processor 185. In other embodiments, the enterprise server 125 includes more or less components than those shown in FIG. 1. The fourth electronic processor 185 is communicatively coupled to the policy database 127, and in some embodiments, such as the embodiment illustrated in FIG. 1, the fourth electronic processor 185 is also communicatively coupled to the sensitive assets 195. The fourth electronic processor 185 controls access provided to the electronic client devices (for example, the first electronic client device 105) to the sensitive assets 195. The fourth electronic processor 185 communicates with the policy check controller 120 (for example, using a communication interface (not shown)) to ensure that the correct policies corresponding to each electronic client device (for example, the first electronic client device 105) are implemented before granting access to the sensitive assets 195.

In the illustrated example, the policy check controller 120 is shown as a separate component of the virtual mobile system 100. In some embodiments, however, the policy check controller 120 is included within the enterprise server 125. In other embodiments, the policy check controller 120 is operated by the enterprise server 125. In yet other embodiments, the policy check controller 120 is operated by and/or co-located with the host virtual machine server 115. Finally, in some embodiments, the policy check controller 120 is operated by a third-party different from the operating party for the enterprise server 125 and different from the operating party for the host virtual machine server 115.

Figure 2:
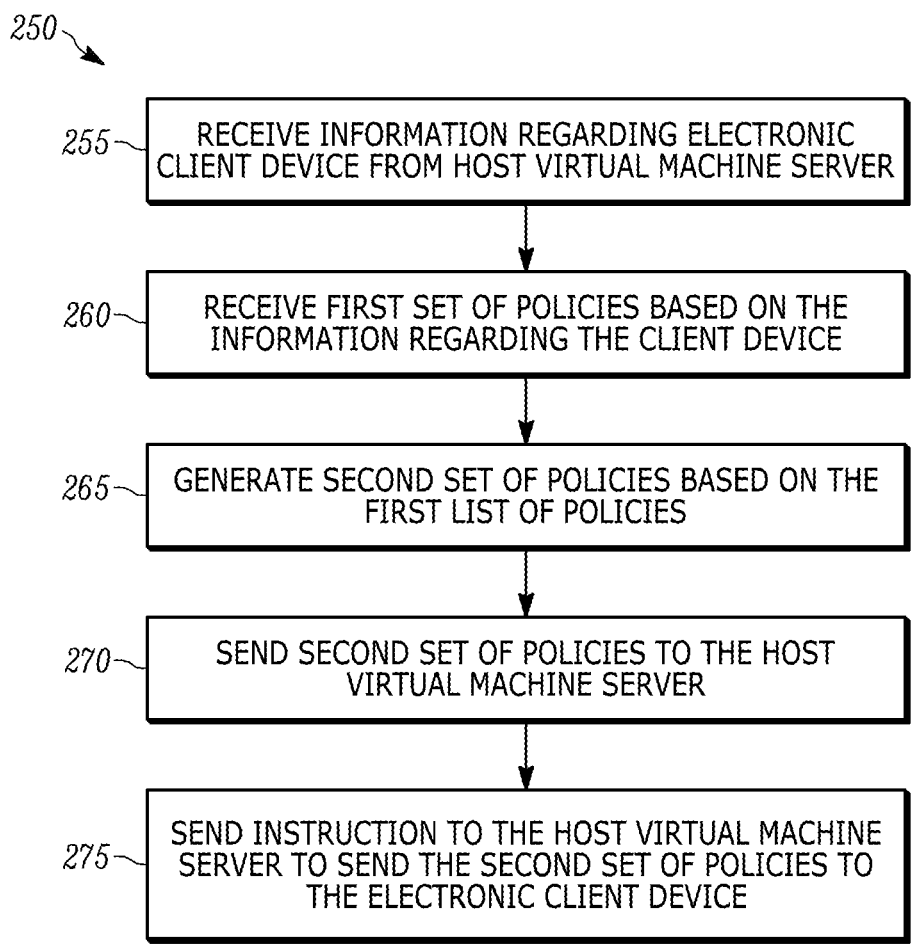
FIG. 2 is a flowchart illustrating a method of operation of a policy check controller.
Figure 7:
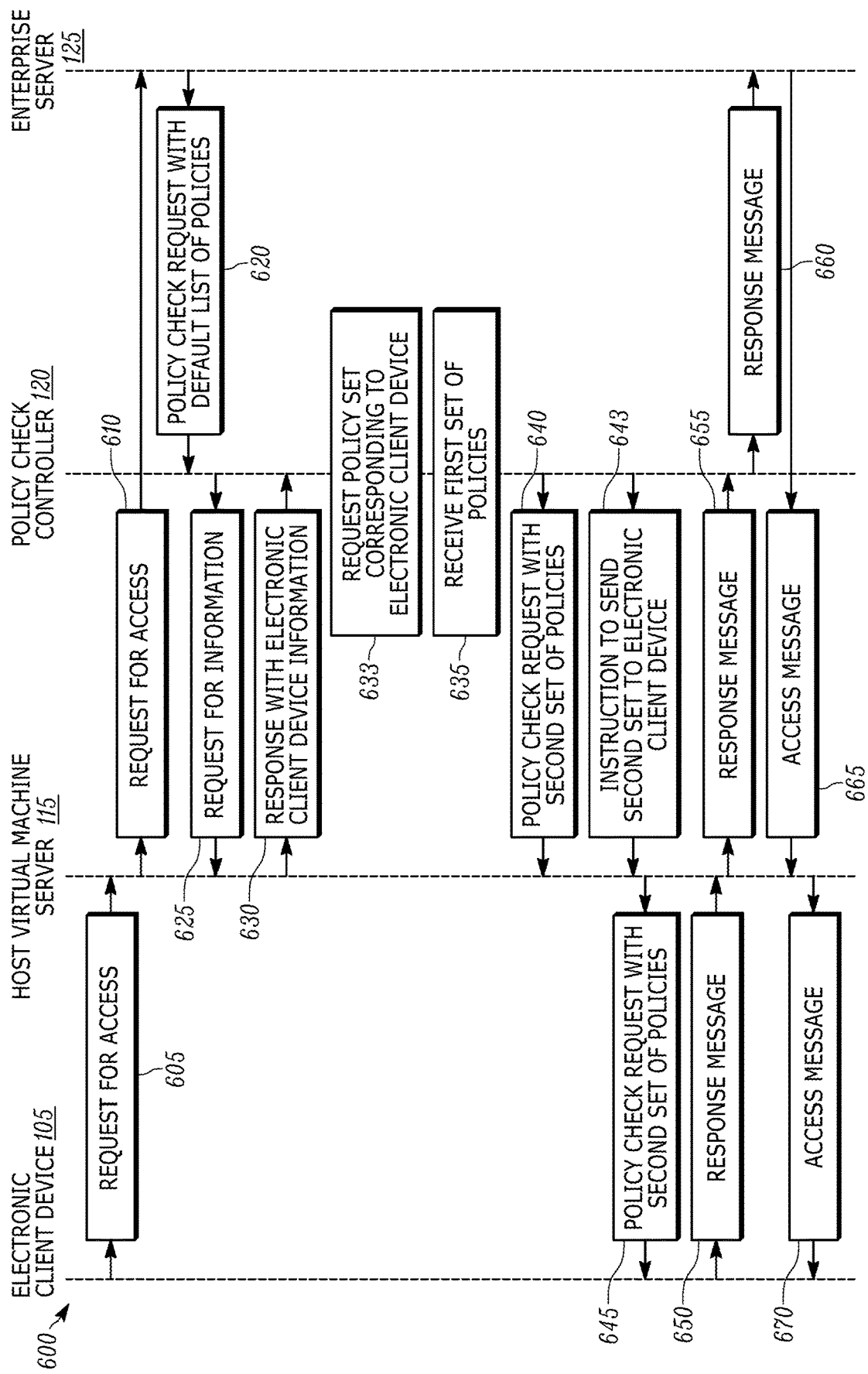
FIG. 7 is a communication flow diagram illustrating communications among components of the virtual mobile system.

FIG. 2 is a flowchart illustrating a method 250 of operation of the policy check controller 120. FIG. 7 is a communication flow diagram 600 illustrating the messages exchanged between the first electronic client device 105, the host virtual machine server 115, the policy check controller 120, and the enterprise server 125. The wireless messages between the components of the virtual mobile system 100 that are illustrated in FIG. 7 will be referred to during the description of the flowcharts to provide a representation of the communication flow between the servers and the client devices.

As shown in FIG. 2, the policy check controller 120 receives information regarding a client device (for example, the first electronic client device 105) from the host virtual machine server 115 (block 255). As discussed above, the information received from the host virtual machine server 115 may include, for example, an operating system of the first electronic client device 105, a version of the operating system (for example, an operating system version number), patch level or status of the operating system of the first electronic client device 105, specific hardware (for example, processor model, external memory such as SD cards) of the first electronic client device 105, carrier associated with the first electronic client device 105, model number of the first electronic client device 105, and other characteristics of the first electronic client device 105. In particular, the information regarding the first electronic client device 105 may include some or all of the first device information 139 stored by the first electronic client device 105. The policy check controller 120 also receives a first set of policies based on the received information regarding the first electronic client device 105 (block 260). The first set of policies includes policies to be enforced by the enterprise server 125 for the specific client device (for example, the first electronic client device 105). In the illustrated embodiment, and as discussed in more detail in FIG. 4, the first set of policies is received from the policy database 127.

The policy check controller 120 then generates a second set of policies based on the first set of policies (block 265). As described in more detail in FIG. 5, the second set of policies includes a subset of the first set of policies based on, for example, policies inherently implemented by the host virtual machine server 115 and/or the guest virtual machine application 137. The policy check controller 120 proceeds to send the second set of policies to the host virtual machine server 115 (block 270) for implementation and/or compliance. The policy check controller 120 also sends an instruction to the host virtual machine server 115 to send the second set of policies to the first electronic client device 105 (block 275) for the first electronic client device 105 to implement (for example, enforce) the policies on the second set of policies. In one embodiment, the policy check controller 120 executes steps described with respect to blocks 270 and 275 within a single communication (for example, within a single message). In other embodiments, the host virtual machine server 115 automatically (for example, without requiring an instruction) forwards any received set of policies to the electronic client device 105 to implement the policies.

In another embodiment, the host virtual machine server 115 determines whether the received set of policies is received from the enterprise server 125 or the policy check controller 120. For example, the host virtual machine server 115 determines whether the sender address corresponds to a registered or otherwise known policy check controller 120. In some embodiments, the host virtual machine server 115 may determine instead whether the sender address from the received set of policies corresponds to the enterprise server 125. When the host virtual machine server 115 determines that the received set of policies are sent from a policy check controller 120 (for example, the host virtual machine server 115 receives the second set of policies as described above), the host virtual machine server 115 forwards the second set of policies to the electronic client device 105. Otherwise, when the host virtual machine server 115 determines that the second set of policies is not from a policy check controller 120 (for example, the host virtual machine server 115 determines that the second set of policies has not been received), the host virtual machine server 115 does not forward the second set of policies. In other words, the host virtual machine server 115 recognizes when the second set of policies is sent from a policy check controller 120 and sends the second set of policies to the electronic client device 105 when the second set of policies are sent from the policy check controller 120.

In some embodiments, the policy check controller 120 does not generate the second set of policies. Rather, in some embodiments, after the policy check controller 120 receives the first set of policies based on the information regarding the first electronic client device 105, the policy check controller 120 forward the first set of policies to the host virtual machine server 115. In some embodiments, as described above, the policy check controller 120 may also send an instruction signal to the host virtual machine server 115 to send the first set of policies to the first electronic client device 105. The first set of policies is based specifically on information regarding the first electronic client device 105. Therefore, the first set of policies is a custom set of policies for implementation by the first electronic client device 105.

Figure 3:
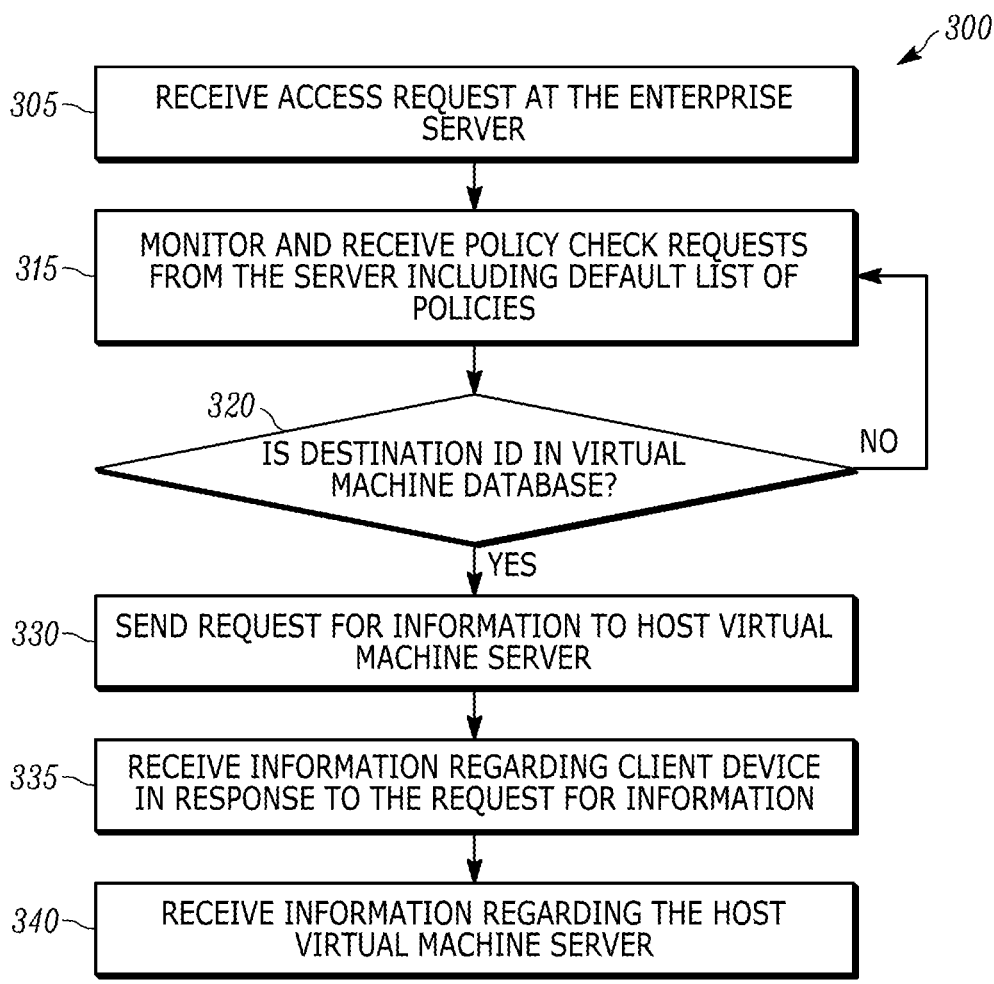
FIG. 3 is a flowchart illustrating a method of receiving information regarding a client device from a host virtual machine server.

FIG. 3 is a flowchart illustrating a method 300 of receiving information from the host virtual machine server 115 regarding the first electronic client device 105. As shown in FIG. 3, the enterprise server 125 first receives an access request from the host virtual machine server 115 (block 305). The access request is illustrated in FIG. 7 as message 610. In the illustrated embodiment, the host virtual machine server 115 sends the access request to the enterprise server 125 in response to receiving an access request from the first electronic client device 105 (exemplary message 605 of FIG. 7). The access request from the first electronic client device 105 includes an identifier for the first electronic client device 105 to indicate to the host virtual machine server 115 the origin of the access request. The access request sent from the host virtual machine server 115 to the enterprise server 125 includes an identifier and information for the host virtual machine server 115 and/or the specific guest virtual machine as the sender for the access request. The enterprise server 125, upon receiving the access request from the host virtual machine server 115, sends a policy check request including a default set of policies, as shown by message 620 of FIG. 7. Because the access request received by the enterprise server 125 includes the identifier and information corresponding to the host virtual machine server 115 and/or the guest virtual machine (for example, an operating system of the guest virtual machine), the default set of policies includes a set of policies for the guest virtual machine. In other words, the default set of policies does not correspond to the policies for the first electronic client device 105, but rather correspond to the policies for the guest virtual machine operating on the first electronic client device 105.

The policy check controller 120 monitors and receives the outgoing policy check requests from the enterprise server 125 (block 315). The policy check controller 120 then determines whether each outgoing policy check request includes a destination address that matches a stored or expected identifier for a guest virtual machine as stored in the virtual machine database 175 (block 320). When the virtual machine database 175 stores a list of each guest virtual machine, the policy check controller 120 determines whether the destination address of the policy check request corresponds to an identifier stored in the virtual machine database 175. On the other hand, when the virtual machine database 175 stores a naming convention specific for a host virtual machine server 115, the policy check controller 120 determines whether the destination address of the policy check request corresponds to a naming convention or format stored in the virtual machine database 175. In particular, the policy check controller 120 monitors the outgoing policy check requests to determine which policy check requests are destined to client devices that operate a guest virtual machine, and are therefore connected to the host virtual machine server 115. In some embodiments the policy check controller 120 also monitors incoming traffic for access requests, for example, to trigger monitoring of the outgoing policy check requests.

When the policy check controller 120 determines that the destination address of the outgoing policy check request does not match one of the identifiers or the naming conventions stored in the virtual machine database 175, the policy check controller 120 continues to monitor the outgoing policy check requests from the enterprise server 125 (block 315). In one example, when the destination identifier of the policy check controller 120 does not match any identifier stored in the virtual machine database 175, the enterprise server 125 sends the policy check request directly to the client device (for example, because the client device does not operate a guest virtual machine).

On the other hand, when the policy check controller 120 determines that the destination address of the outgoing policy check request matches one of the identifiers or one of the naming conventions stored in the virtual machine database 175, the policy check controller 120 sends a request for more information to the host virtual machine server 115 (block 330). The request for more information is illustrated in FIG. 7 as message 625. The policy check controller 120 then receives information regarding the first electronic client device 105 in response to sending the request to the host virtual machine server 115 (block 335), as illustrated by message 630 of FIG. 7. In some embodiments, the host virtual machine server 115 stores information for the first electronic client device 105 and sends the information regarding the first electronic client device 105 directly from the host virtual machine server 115. In other embodiments, the host virtual machine server 115 forwards the request for information to the first electronic client device 105, receives a response from the first electronic client device 105, and then responds to the policy check controller 120 with the received information from the first electronic client device 105. The information regarding the first electronic client device 105 is discussed above.

In some embodiments, such as the one illustrated by FIG. 3, the host virtual machine server 115 also sends information regarding the host virtual machine server 115 to the policy check controller 120. The policy check controller 120 receives the information regarding the host virtual machine server 115, the guest virtual machines, and/or the virtual machine application 137 (block 340). The information regarding the host virtual machine server 115 may include, for example, the operating system of a specific guest virtual machine, policies enforced by the host virtual machine server 115, policies enforced by the virtual machine application 137 installed on the first electronic client device 105, data storage options and policies, service level agreements, support for application program interfaces (API), and the other similar information as discussed above.

Figure 4:
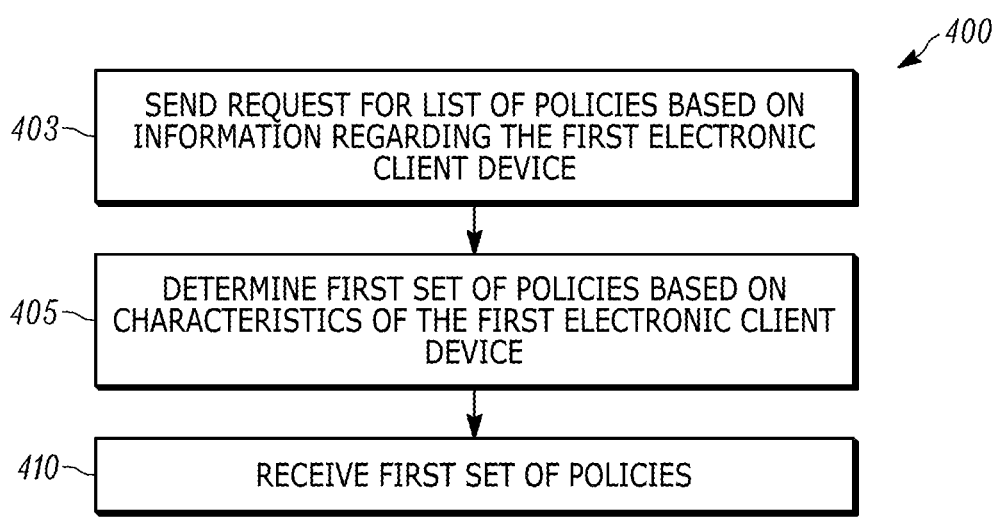
FIG. 4 is a flowchart illustrating a method of receiving a first set of policies from an enterprise server.

FIG. 4 is a flowchart illustrating a method 400 of receiving the first set of policies based on the characteristics of the first electronic client device 105. As shown in FIG. 4, the policy check controller 120, in response to receiving information regarding the first electronic client device 105 from the host virtual machine server 115, sends a request to the policy database 127 for a policy set corresponding to the first electronic client device 105 based on the information regarding the first electronic client device 105 received from the host virtual machine server 115 (block 403). The request to the policy database 127 is shown as communication 633 of FIG. 7. The policy database 127 determines the first set of policies based on which stored set of policies is associated with the characteristics of the first electronic client device 105 (block 405). The policy check controller 120 then receives the first set of policies from the policy database 127 (block 410). In another embodiment the policy database 127 is co-located with the enterprise server 125, and can be accessed indirectly by the policy check controller 120 after requesting access through the enterprise server 125. In one embodiment, the policy check controller 120 forwards the characteristics of the first electronic client device 105 to the enterprise server 125. In such embodiments, the enterprise server 125 accesses the policy database 127 to determine an appropriate set of policies for the first electronic client device 105 (for example, the first set of policies). The enterprise server 125 then sends the policy to the policy check controller 120. In other embodiments, however, after the policy check controller 120 receives the information regarding the first electronic client device 105, the policy check controller 120 accesses the policy database 127 to determine an appropriate set of policies based on the characteristics of the first electronic client device 105. The policy database 127 then returns the set of policies associated with the characteristics of the first electronic client device 105.

Figure 5:
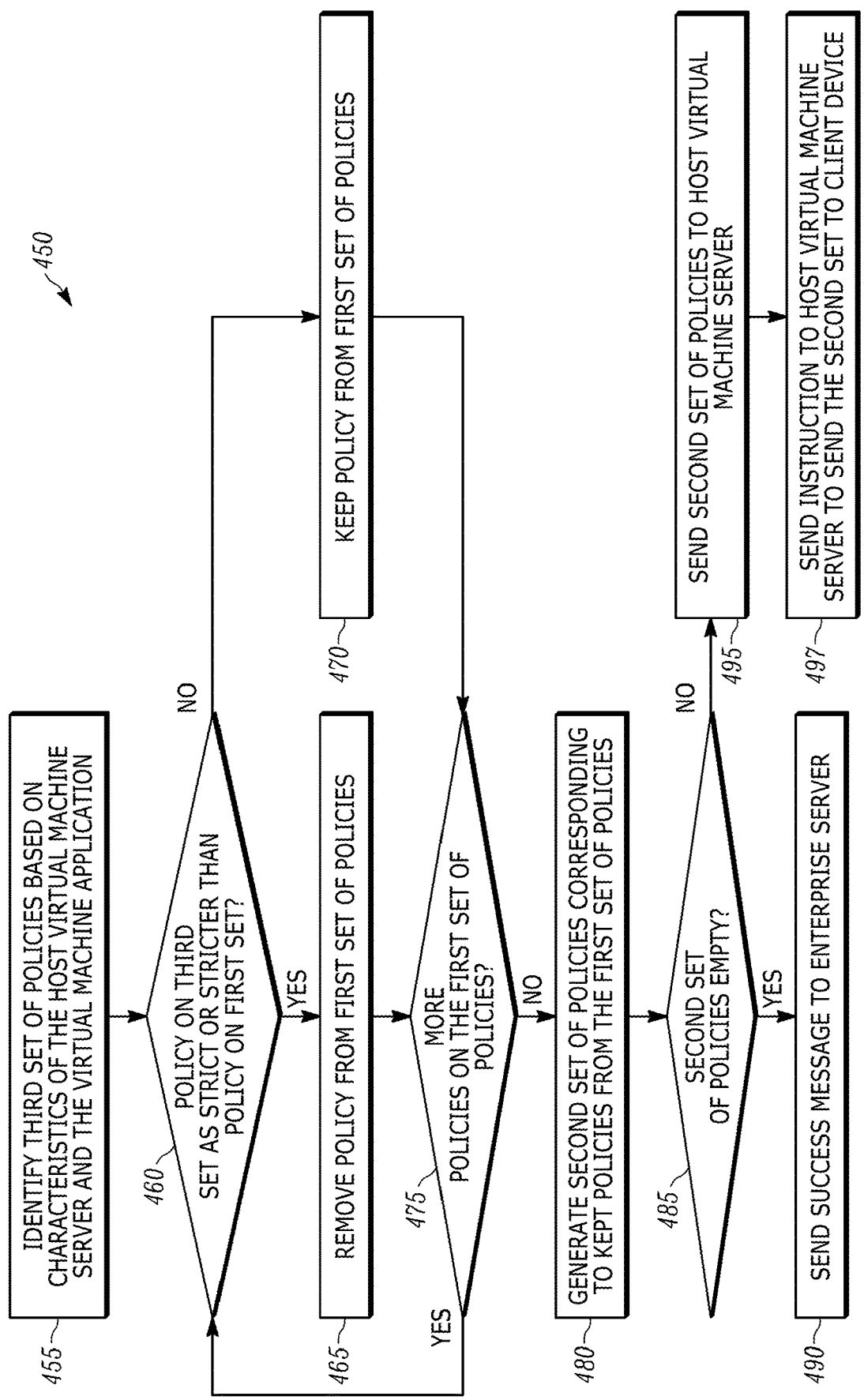
FIG. 5 is a flowchart illustrating a method of generating and sending a second set of policies.

FIG. 5 is a flowchart illustrating a method 450 of generating and sending a second set of policies to the host virtual machine server 115. As shown in FIG. 5, the policy check controller 120 identifies a third set of policies based on characteristics of the host virtual machine server 115 and the virtual machine application 137 stored on the first electronic client device 105 (block 455). The characteristics of the host virtual machine server 115 and the virtual machine application 137 are received from the host virtual machine server 115. The third set of policies includes policies that are enforced by the host virtual machine server 115 and policies that are enforced by the virtual machine application 137 operating at the first electronic client device 105. The policy check controller 120 then compares the third set of policies with the first set of policies. Specifically, the policy check controller 120 determines whether the policies of the third set are as strict or stricter than the policies of the first set (block 460).

When the policy check controller 120 determines that a policy of the third set is as strict as or stricter than a corresponding policy of the first set, the policy check controller 120 removes the policy from the first set (block 465). On the other hand, when the policy check controller 120 determines that the policy of the third set is not as strict as the corresponding policy of the first set, the policy check controller 120 keeps the policy of the first set (block 470). After removing or keeping a policy of the first set, the policy check controller 120 determines whether there are more policies of the first set of policies to be compared to corresponding policies of the third set (block 475).

When the policy check controller 120 determines that there are more policies of the first set to be compared to corresponding policies of the third set, the policy check controller 120 returns to block 460 to determine whether the policy of the third set is as strict as or stricter than the corresponding policy of the first set. When the policy check controller 120 determines that there are no more policies of the first set to be compared to corresponding policies of the third set (for example, all the policies of the first set that have a corresponding policy on the third set have been compared to the corresponding policy of the third set), the policy check controller 120 generates the second set of policies corresponding to the kept policies of the first set (block 480). In other words, the policy check controller 120 generates the second set of policies containing the policies of the first set that are stricter than the corresponding policies of the third set and policies of the first set that do not have a corresponding policy in the third set. In some situations, the second set of policies is different, and often shorter, than the first set of policies. However, in situations in which all of the policies of the third set are less strict than those of the first set of policies, the first set of policies and the second set of policies may be the same.

The policy check controller 120 then determines whether the second set of policies is empty (for example, if all the policies of the third set are as strict as or stricter than the policies of the first set) at block 485. When the policy check controller 120 determines that the second set of policies is empty, the policy check controller 120 sends a success message to the enterprise server 125. The success message is sent to the enterprise server 125 when all the policies of the first set (or stricter policies) are enforced by the host virtual machine server 115 and/or by the virtual machine application 137 stored on the first electronic client device 105. In one embodiment, the enterprise server 125 may interpret the success message as indicating the policies of the first set are implemented by the first electronic client device 105 without acknowledging that some of the policies of the first set are implemented by the host virtual machine server 115. In one embodiment, the success message is a response message including a success message (for example, an indication that the policies of the first set have been implemented). In the preferred embodiment, the success message is a response message with a success message. On the other hand, when the policy check controller 120 determines that the second set of policies is not empty, the policy check controller 120 sends the second set of policies to the host virtual machine server 115 (block 495). Message 640 of FIG. 7 illustrates the second set of policies being sent to the host virtual machine server 115.

The policy check controller 120 also sends an instruction to the host virtual machine server 115 to send the second set of policies to the first electronic client device 105 (block 497). Message 643 of FIG. 7 illustrates the instruction to the host virtual machine server 115 to forward the second set of policies to the first electronic client device 105. As discussed above with respect to blocks 270 and 275, the policy check controller 120 sends the second set of policies and the instruction to send the second set of policies to the first electronic client device within the same communication (for example, the same wireless message). In other embodiments, as discussed above, the policy check controller 120 does not send the instruction signal. In some embodiments, the policy check controller 120 stores the second set of policies sent to the host virtual machine server 115 for future use. The second set of policies may be stored in the virtual machine database 175 or in a different database.

Figure 6:
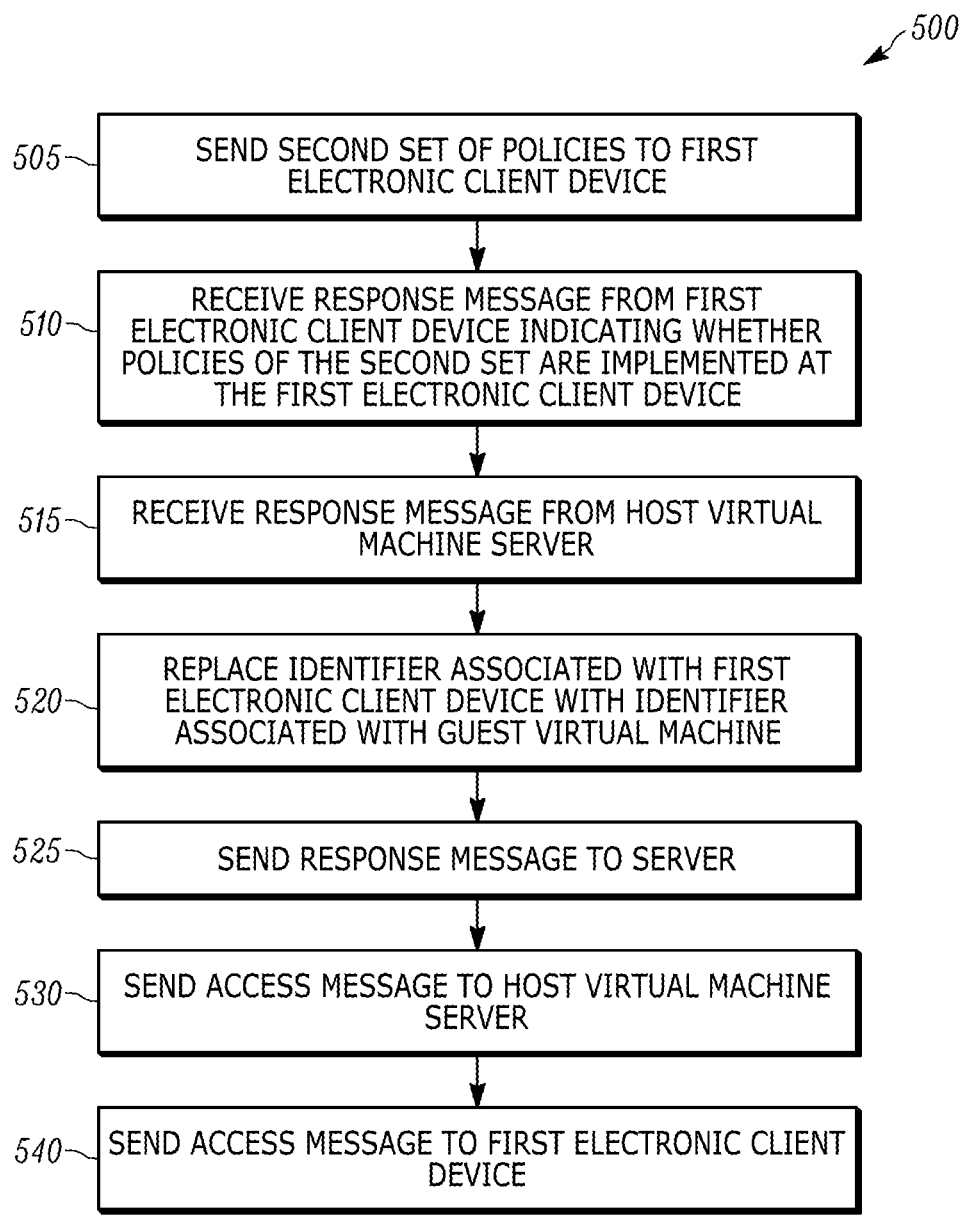
FIG. 6 is a flowchart illustrating a method of granting access to the enterprise server.

FIG. 6 illustrates a method 500 of granting access to sensitive assets controlled by the enterprise server 125 to the first electronic client device 105. As shown by message 645 of FIG. 7, in the illustrated embodiment, the host virtual machine server 115 sends the second set of policies to the first electronic client device 105 (block 505). The first electronic client device 105 receives the second set of policies, attempts to implement the policies of the second set, and sends a response message to the host virtual machine server 115 indicating whether the policies of the second set have been implemented (block 510). When the first electronic client device 105 implements all the policies of the second set, the response message includes a success message. Otherwise, when the first electronic client device 105 is not able to implement all the policies of the second set, the response message may include details on which policies were not implemented by the first electronic client device 105. In some embodiments, the response message includes a failure flag without details regarding which policies were not implemented by the first electronic client device 105. The response from the first electronic client device 105 is illustrated as message 650 of FIG. 7. In the illustrated example of FIG. 7, the response from the first electronic client device 105 includes a success message. The policy check controller 120 then receives the response message from the host virtual machine server 115 with a success or failure message and optionally indicating which policies of the second set have been implemented (block 515). The response message from the host virtual machine server 115 to the policy check controller 120 is illustrated as message 655 of FIG. 7. In the example of FIG. 7, the response message from the host virtual machine server 115 includes a success message.

In one embodiment, upon receiving the response message, the policy check controller 120 replaces the client device identifier (for example, an identifier associated with the first electronic client device 105), and replaces the client device identifier with an identifier for the guest virtual machine operating on the first electronic client device 105 (block 520). After replacing the client device identifier, the policy check controller 120 sends the response message to the enterprise server 125 (block 525), as illustrated by message 660 of FIG. 7. When the response message includes a success message, the enterprise server 125 then sends an access message to the host virtual machine server 115 granting access to the sensitive assets 195 by the first electronic client device 105 (block 530). On the other hand, when the policy check response includes a failure message, the enterprise server 125 does not provide access to the first electronic client device 105. In some embodiments, the enterprise server 125 may still provide access to the sensitive assets 195 when the policy check response includes a failure message based on the specific policies that were implemented by the first electronic client device 105. For example, the second set of policies may include some optional policies, such that when the optional policies are not implemented the enterprise server 125 still provides access to the sensitive assets 195 to the first electronic client device 105. In some embodiments, the enterprise server 125 may still provide some, but limited, access to the sensitive assets 195 when the policy check response includes a failure message. In some embodiments, the enterprise server 125 initiates other actions such as, for example, instructing the electronic client device 105 to be reset, in response to receiving a failure message. In the example shown in FIG. 7, the response message includes a success message and an access message (message 665 of FIG. 7) is then provided to the host virtual machine server 115 and to the first electronic client device 105. Additionally, the access message (for example, message 670 of FIG. 7) is also forwarded to the first electronic client device 105. The first electronic client device 105 can then access the sensitive assets 195 through the host virtual machine server 115.

Therefore, the policy check controller 120 bridges communication between the enterprise server 125 and the client devices (for example, the first electronic client device 105). The policy check controller 120 ensures that the correct device-specific policies are enforced on devices running a virtual machine application and accessing the enterprise server 125 through guest virtual machines. The policy check controller 120 also helps to determine which policies are inherently or otherwise met by the host virtual machine server 115, the virtual machine application 137 operating specifically at the first electronic client device 105, and/or the first electronic client device 105. The policy check controller 120 then modifies the set of policies sent to the host virtual machine server 115 and/or the first electronic client device 105 to include only those policies that are not inherently met by the host virtual machine server 115 and/or the virtual machine application 137.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of enforcing device security policies, the method comprising: receiving, with an electronic processor of a policy check controller and from a host virtual machine server operating a host virtual machine that corresponds to a guest virtual machine operating on an electronic client device, information regarding the electronic client device operating the guest virtual machine; receiving, with the electronic processor, a first set of device security policies determined based on the information regarding the electronic client device; receiving, with the electronic processor and from the host virtual machine server, information regarding the host virtual machine server, the information regarding the host virtual machine server including one selected from a group consisting of a service level agreement, device security policies enforced by a virtual machine application running on the electronic client device, a file server hosted in the host virtual machine server, and device security policies enforced by the host virtual machine server; generating, with the electronic processor, a second set of device security policies based on the first set of device security policies and the information regarding the host virtual machine server; sending, from the electronic processor, the second set of device security policies to the host virtual machine server; and sending, from the electronic processor, an instruction to the host virtual machine server to send the second set of device security policies to the electronic client device; wherein the first set of device security policies and the second set of device security policies are used to manage access to one of a group consisting of services, data, and networks.

2. The method of claim 1, further comprising: sending, with the electronic processor, an information request to the host virtual machine server, the information request requesting information regarding the electronic client device operating the guest virtual machine; and wherein receiving the information from the host virtual machine server includes receiving an information response from the host virtual machine server in response to the information request.

3. The method of claim 1, wherein generating the second set of device security policies includes identifying, based on the information regarding the host virtual machine server, a third set of device security policies enforced by one selected from a group consisting of the host virtual machine server and the virtual machine application running on the electronic client device; and removing, with the electronic processor, a portion of the third set of device security policies from the first set of device security policies to generate the second set of device security policies.

4. The method of claim 3, wherein the portion of the third set of device security policies includes device security policies enforced by one selected from a group of the host virtual machine server and the virtual machine application that are as strict or stricter than the device security policies of the first set of device security policies.

5. The method of claim 1, wherein receiving information regarding the electronic client device includes receiving one selected from a group consisting of an operating system of the electronic client device, a version of the operating system of the electronic client device, patch level of the operating system of the electronic client device, hardware information for the electronic client device, and a carrier associated with the electronic client device.

6. The method of claim 1, further comprising: receiving, at the electronic processor, a policy check request from a server, the policy check request including a destination address; determining, with the electronic processor, whether the destination address corresponds to an address associated with the guest virtual machine; and sending, from the electronic processor, a request to the host virtual machine server for information regarding the electronic client device when the destination address corresponds to an address associated with the guest virtual machine.

7. The method of claim 1, further comprising receiving, from the host virtual machine server, policy enforcement results indicating which device security policies, from the second set of device security policies are enforced by the electronic client device.

8. The method of claim 1, wherein receiving the first set of device security policies includes sending, from the electronic processor, a request to a policy database for a set of device security policies corresponding to the electronic client device based on the information received from the host virtual machine server; and receiving, at the electronic processor, the first set of device security policies from the policy database in response to sending the request.

9. A policy check controller comprising: an electronic processor; and a communication interface configured to exchange messages between the electronic processor and a host virtual machine server operating a host virtual machine that corresponds to a guest virtual machine operating on an electronic client device, and between the electronic processor and a server; wherein the electronic processor is coupled to the communication interface, and configured to receive, with the communication interface, information from the host virtual machine server regarding the electronic client device operating the guest virtual machine, receive, with the communication interface, a first set of device security policies based on the information regarding the electronic client device, receive, with the electronic processor and from the host virtual machine server, information regarding the host virtual machine server, the information regarding the host virtual machine server including one selected from a group consisting of a service level agreement, device security policies enforced by a virtual machine application running on the electronic client device, a file server hosted in the host virtual machine server, and device security policies enforced by the host virtual machine server, generate a second set of device security policies based on the first set of device security policies and the information regarding the host virtual machine server, send, with the communication interface, the second set of device security policies to the host virtual machine server, and send, with the communication interface, an instruction to the host virtual machine server to send the second set of device security policies to the electronic client device; wherein the first set of device security policies and the second set of device security policies are used to manage access to one selected from a group consisting of services, data, and networks associated with the server.

10. The policy check controller of claim 9, wherein the electronic processor is further configured to send, with the communication interface, an information request to the host virtual machine server, the information request requesting information regarding the electronic client device operating the guest virtual machine, and wherein receiving the information from the host virtual machine server includes receiving an information response from the host virtual machine server in response to the information request.

11. The policy check controller of claim 9, wherein the electronic processor is configured to identify, based on the information received regarding the host virtual machine server, a third set of device security policies enforced by one selected from a group consisting of the host virtual machine server and the virtual machine application running on the electronic client device, and remove, from the first set of device security policies, device security policies of the third set of device security policies that are as strict or stricter than the device security policies of the first set of device security policies, and generate the second set of device security policies based on remaining device security policies of the first set of device security policies.

12. The policy check controller of claim 9, wherein the information regarding the electronic client device includes one selected from a group consisting of an operating system of the electronic client device, a version of the operating system of the electronic client device, patch level of the operating system of the electronic client device, hardware information for the electronic client device, and a carrier associated with the electronic client device.

13. The policy check controller of claim 9, wherein the electronic processor is further configured to receive a policy check request from the server, the policy check request including a destination address, determine whether the destination address corresponds to an address associated with the guest virtual machine, and send, with the communication interface, a request to the host virtual machine server for information regarding the electronic client device when the destination address corresponds to an address associated with the guest virtual machine.

14. The policy check controller of claim 9, wherein the electronic processor is further configured to receive, with the communication interface and from the host virtual machine server, policy enforcement results indicating which device security policies, from the second set of device security policies are enforced by the electronic client device.

15. The policy check controller of claim 9, wherein the policy check controller is co-located with the host virtual machine server.

16. The policy check controller of claim 9, wherein the policy check controller is included within the server.

* * * * *